(12) United States Patent
Malloy, III

(10) Patent No.: US 9,773,575 B2
(45) Date of Patent: Sep. 26, 2017

(54) PASSIVE FILTRATION OF AIR EGRESSING FROM NUCLEAR CONTAINMENT

(71) Applicant: Babcock & Wilcox mPower, Inc., Charlotte, NC (US)

(72) Inventor: John D Malloy, III, Goode, VA (US)

(73) Assignee: BWXT MPower, Inc., Charlotte, NC (US)

(*) Notice: Subject to any disclaimer, the term of this patent is extended or adjusted under 35 U.S.C. 154(b) by 303 days.

(21) Appl. No.: 14/299,156

(22) Filed: Jun. 9, 2014

(65) Prior Publication Data
US 2015/0357060 A1 Dec. 10, 2015

(51) Int. Cl.
| G21C 9/00 | (2006.01) |
|---|---|
| G21C 13/10 | (2006.01) |
| G21C 15/12 | (2006.01) |

(52) U.S. Cl.
CPC ............. *G21C 13/10* (2013.01); *G21C 15/12* (2013.01); *Y02E 30/40* (2013.01)

(58) Field of Classification Search
CPC ................................ G21C 13/10; G21C 15/12
USPC ................ 376/293, 298, 299, 309, 310, 314
See application file for complete search history.

(56) References Cited

U.S. PATENT DOCUMENTS

| 3,454,466 A | * | 7/1969 | Pitt ........................ G21C 9/008 |
| | | | 376/293 |
| 3,706,630 A | | 12/1972 | Cohen et al. |
| 4,036,021 A | | 7/1977 | Kelp |
| 4,057,464 A | * | 11/1977 | Mair ..................... G21C 13/022 |
| | | | 376/314 |
| 4,397,793 A | | 8/1983 | Stillman et al. |
| 4,927,596 A | | 5/1990 | Minnick |
| 5,049,353 A | * | 9/1991 | Conway ................. G21C 15/12 |
| | | | 376/299 |
| 5,169,596 A | * | 12/1992 | Orr ....................... G21C 13/022 |
| | | | 376/299 |

(Continued)

FOREIGN PATENT DOCUMENTS

WO 2012/149057 11/2012

OTHER PUBLICATIONS

International Search Report and Written Opinion dated Sep. 14, 2015 for PCT/US2015/034688.

*Primary Examiner* — Jack W Keith
*Assistant Examiner* — Daniel Wasil
(74) *Attorney, Agent, or Firm* — Nelson Mullins Riley & Scarborough, LLP

(57) ABSTRACT

A nuclear reactor includes a reactor core comprising fissile material disposed in a reactor pressure vessel. A radiological containment contains the nuclear reactor. A containment compartment contains the radiological containment. A heat sink includes a chimney configured to develop an upward-flowing draft in response to heated fluid flowing into a lower portion of the chimney. A fluid conduit is arranged to receive fluid from the containment compartment and to discharge into the chimney. A filter may be provided, with the fluid conduit including a first fluid conduit arranged to receive fluid from the containment compartment and to discharge into an inlet of the filter, and a second fluid conduit arranged to receive fluid from an outlet of the filter and to discharge into the chimney. As the draft is developed passively, there is no need for a blower or pump configured to move fluid through the fluid conduit.

7 Claims, 2 Drawing Sheets

(56) References Cited

U.S. PATENT DOCUMENTS

| | | | | |
|---|---|---|---|---|
| 5,215,708 A | * | 6/1993 | Fennern | G21C 15/18 376/299 |
| 2013/0051511 A1 | * | 2/2013 | Watson | G21C 13/02 376/273 |
| 2014/0321597 A1 | * | 10/2014 | Singh | G21C 15/12 376/298 |

* cited by examiner

PASSIVE FILTRATION OF AIR EGRESSING FROM NUCLEAR CONTAINMENT

This invention was made with Government support under Contract No. DE-NE0000583 awarded by the Department of Energy. The Government has certain rights in this invention.

BACKGROUND

The following pertains to the nuclear reactor safety arts, nuclear power arts, and related arts.

A nuclear reactor includes a radioactive core comprising a fissile material immersed in coolant. In a light water reactor, the fissile material is typically a uranium composition such as uranium oxide ($UO_2$) enriched in the fissile $^{235}U$ isotope, and the coolant is purified water. The nuclear reactor core and the immersing coolant are contained in a reactor pressure vessel. A coolant flow circuit may be provided via large diameter piping, e.g. between the reactor pressure vessel and an external steam generator, or between the reactor pressure vessel and a turbine. For example, in a typical boiling water reactor (BWR), a coolant circuit is provided to transfer coolant in the form of steam to drive a turbine to generate electricity. In a typical pressurized water reactor (PWR), a coolant circuit is provided to transfer coolant to a steam generator. In integral PWR Designs, the steam generator is located inside the reactor pressure vessel, so that there is no external coolant loop implicating large diameter piping.

In a loss of coolant accident (LOCA), there is a radiological release outside of the reactor pressure vessel as escaping coolant flashes to steam. To prevent radiological release to the environment, the reactor pressure vessel is contained in a radiological containment (sometimes shortened to "containment"). A PWR with its external steam generator is located inside a radiological containment in the form of a steel or steel-reinforced concrete structure. This radiological containment is located in a compartment of a surrounding reactor building that services the nuclear reactor and ancillary components (sometimes also called a reactor service building). In PWR designs, the steam generator (whether external from the reactor pressure vessel or integrally located as in integral PWR designs) also receives secondary coolant that is kept separate from the (primary) coolant that flows through the reactor pressure vessel. This secondary coolant is therefore not contaminated with radiological contaminants, and may be piped outside containment through suitable safety valving.

A typical BWR nuclear island is designed similarly to a PWR. However, in a BWR coolant in the form of steam is piped directly into the turbine, which is located outside containment. (By contrast, in a PWR secondary coolant converted to steam and drives the turbine). This steam contains radiological contaminants. Accordingly, in some BWR systems a secondary containment is provided which surrounds the (primary) radiological containment and the turbine. The secondary containment is active, i.e. maintained at a negative pressure using active blowers to pull air through filters to the outside environment.

Some primary containment designs have leakage rates as low as 0.1% of containment volume per day, providing a decontamination factor over the first 24 hours after a radiological release of approximately 1000. A secondary containment can improve upon this, but requires AC power to operate the blowers and other active components. Secondary containment is difficult to employ in a passive nuclear power plant because safety-related AC power is not available. Even where safety-related AC power is available, it can be lost due to weather-related events or the like.

BRIEF SUMMARY

In some embodiments described herein as illustrative examples, a nuclear reactor system comprises: a nuclear reactor including a reactor core comprising fissile material disposed in a reactor pressure vessel; a radiological containment containing the nuclear reactor; a containment compartment containing the radiological containment; a heat sink comprising a chimney configured to develop an upward flowing draft in response to heated fluid flowing into a lower portion of the chimney; and a fluid conduit arranged to receive fluid from the containment compartment and to discharge into the chimney. The nuclear reactor system may further comprise a filter, with the fluid conduit including a first fluid conduit arranged to receive fluid from the containment compartment and to discharge into an inlet of the filter, and a second fluid conduit arranged to receive fluid from an outlet of the filter and to discharge into the chimney. The filter may comprise at least one of a charcoal filter and a zeolite filter. The heat sink may further include a body of water in thermal communication with the radiological containment to transfer heat from the radiological containment into the body of water, and a heat sink conduit arranged to receive water vapor or steam from the body of water and to discharge the water vapor or steam into the lower portion of the chimney. In some embodiments there is no blower or pump configured to move fluid through the fluid conduit.

In some embodiments described herein as illustrative examples, a method is disclosed, which operates in conjunction with a nuclear reactor including a reactor core comprising fissile material disposed in a reactor pressure vessel, and a radiological containment containing the nuclear reactor, and a containment compartment containing the radiological containment. The method comprises: generating a draft in a chimney; and using the draft to draw air from the containment compartment into the chimney. The method may further comprise, before the air reaches the chimney, filtering the air drawn from the containment compartment using a filter effective to remove radioactive particles from the air. Additionally or alternatively, the method may further comprise, after the air is drawn into the chimney, filtering the air using a filter disposed in the chimney. The operation of using the draft to draw air from the containment compartment into the chimney may suitably comprise providing a fluid conduit connecting the containment compartment with the chimney wherein the fluid conduit connects with the chimney at an elevation effective for the draft to draw air from the fluid conduit into the chimney. The method may further comprise responding to a reactor loss of coolant accident (LOCA) wherein one or both of the LOCA and the responding discharges coolant from the nuclear reactor into the radiological containment whereby both heat and radioactive particles are transferred from the nuclear reactor into the radiological containment. In such embodiments the method may further comprise leaking radioactive particles from the radiological containment into the containment compartment at a leakage rate of the radiological containment, and filtering air drawn using the draft from the containment compartment into the chimney using a filter effective to filter out radioactive particles leaked into the containment compartment.

In some embodiments described herein as illustrative examples, a system is disclosed, which is operative operative in conjunction with a nuclear reactor including a reactor core comprising fissile material disposed in a reactor pressure vessel, and a radiological containment containing the nuclear reactor. The system comprises: a containment compartment containing the radiological containment; a heat sink comprising a chimney; and a fluid conduit connecting the containment compartment with the chimney. The fluid conduit may include a filter configured to filter radioactive particles emitted by the nuclear reactor in a LOCA.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

Figure 1:
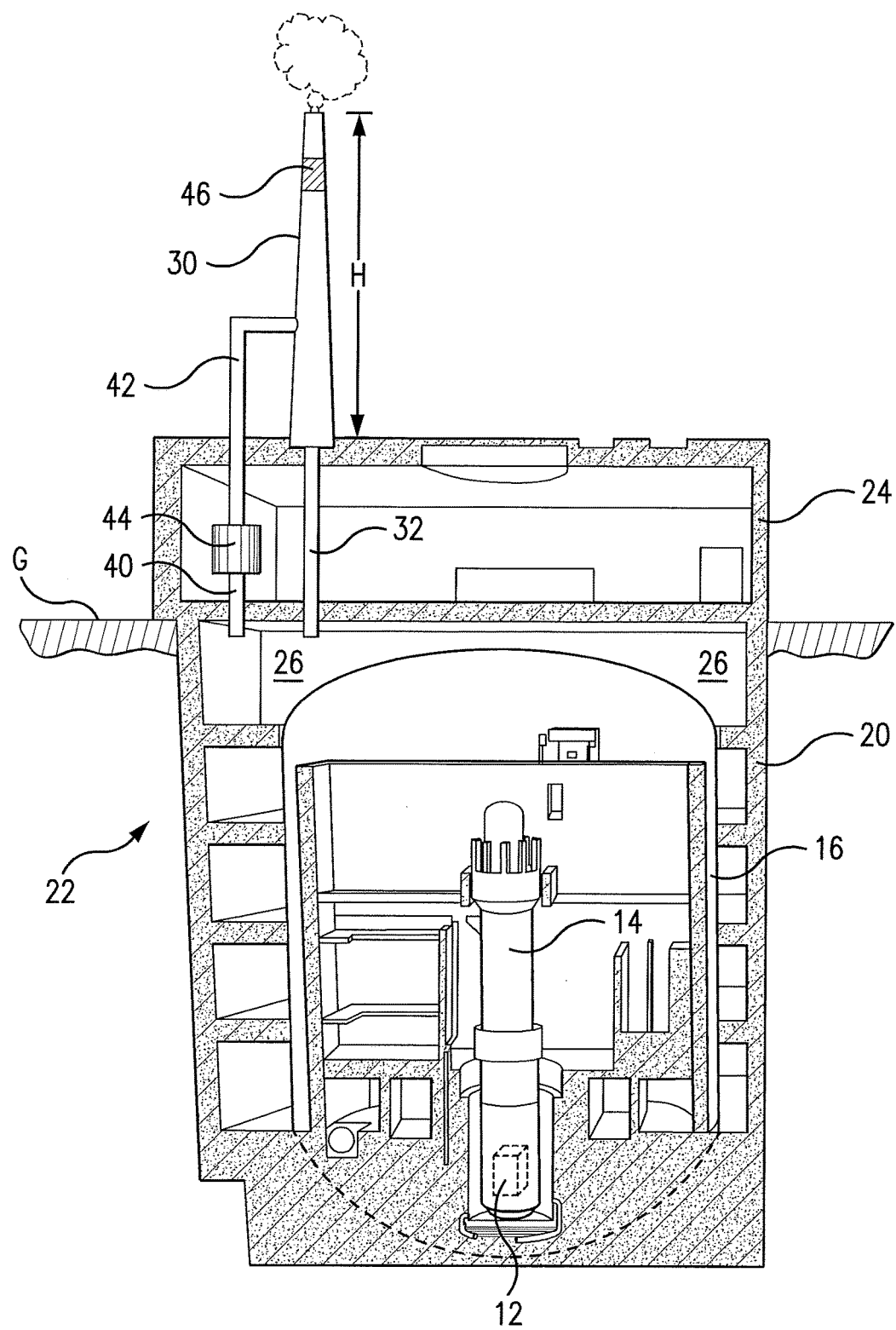
FIG. 1 diagrammatically shows a first illustrative nuclear reactor system embodiment as disclosed herein.

With reference to FIG. 1, a nuclear reactor system includes a nuclear reactor 10 comprising a nuclear reactor core 12 disposed in a reactor pressure vessel 14. It is to be understood that the reactor pressure vessel 14, which is typically a stainless steel or other metal vessel, is opaque such that the nuclear reactor core 12 is occluded by the reactor pressure vessel 14; accordingly, FIG. 1 shows the reactor core 12 diagrammatically in phantom, i.e. using dashed lines, to indicate it is actually hidden from view being disposed inside the reactor pressure vessel 14. During reactor operation, the reactor pressure vessel 14 contains coolant (sometimes referred to as "primary" coolant to distinguish, in the case of a PWR, from secondary coolant that flows through the steam generator). The nuclear reactor core 12 contains a fissile material. In the illustrative examples, the nuclear reactor is a light water reactor employing a uranium composition such as uranium oxide ($UO_2$) enriched in the fissile $^{235}U$ isotope, and the coolant is purified water. However, other reactors are contemplated, such as a sodium-cooled reactor. During reactor operation, the nuclear reactor core 12 supports a nuclear fission chain reaction involving the fissile material (e.g. $^{235}U$), and the nuclear fission chain reaction generates heat in the nuclear reactor core 12 that in turn heats the coolant in the reactor pressure vessel 14. The coolant serves (at least) two purposes: (1) providing cooling of the nuclear reactor core 12, and (2) providing a heat transfer medium to transfer heat from the nuclear reactor core 12 to another component, such as a steam generator (in the case of a typical PWR-based nuclear power plant) or a turbine (in the case of a typical BWR-based plant). The illustrative nuclear reactor 12 is an integral PWR design in which the steam generators are located inside the reactor pressure vessel 14 (and hence are not visible). In other PWR designs (not shown) the steam generators are external units connected with the nuclear reactor by large-diameter piping. BWR designs (also not shown) typically omit the steam generator component because the (primary) coolant boils inside the reactor pressure vessel, and the boiling primary coolant directly serves as steam to drive the turbine via suitable large-diameter piping running between the BWR and the turbine.

The nuclear reactor is disposed inside a radiological containment 16, which is typically a steel or steel-reinforced concrete structure. The illustrative radiological containment 16 is a steel cylindrical structure with top and bottom domes; however, other geometries, e.g. rectangular geometries, are contemplated. The lower dome of the illustrative radiological containment 16 is shown in dashed line, and is embedded in the concrete floor of a containment compartment 20 that contains the radiological containment 16. The illustrative containment compartment 20 is part of a reactor building 22 (shown in part in FIG. 1) that services the nuclear reactor and ancillary components. The reactor building 22 is also referred to in the art by other nomenclatures, such as "reactor service building". The illustrative reactor building 22 is partially subterranean (where ground level is diagrammatically indicated by ground G), and the illustrative containment compartment 20 is wholly underground. However, it is contemplated for the containment compartment to be only partially underground or even above-ground. The illustrative reactor building 22 includes an above-ground portion 24 located above the containment compartment 20. The above-ground portion 24 may, for example, serve as a garage, warehouse, or the like where trucks delivering nuclear fuel or other components can be received. While the illustrative containment compartment 20 is part of the illustrative reactor building 22, more generally the containment compartment is a compartment that contains the radiological containment and that is configured for passive removal and optional filtering of air in the compartment using techniques as disclosed herein.

The radiological containment 16 is designed to contain radiation that escapes from the nuclear reactor in the event of a loss of coolant accident (LOCA). A LOCA arises when there is a break in the reactor pressure vessel 14, or in a large-diameter pipe connecting with the reactor pressure vessel 14, such that (primary) coolant in the nuclear reactor enters into the radiological containment 16. This usually occurs, at least initially, in the form of steam or a two-phase mixture as escaping coolant flashes to steam due to rapid pressure drop. Depending upon the nature and extent of the LOCA break, the remedial response performed by automatic systems and/or by actions of reactor operators may include depressurizing the reactor pressure vessel 14 by intentionally venting coolant from the nuclear reactor into the radiological containment 16, or keeping the reactor under (possibly reduced) pressure while monitoring reactor conditions and closing the LOCA break, e.g. using suitable valves. In either case, the nuclear reactor core 12 should be kept immersed in coolant, and to this end additional coolant may be injected into the pressure vessel 14 from an intermediate pressure injection tank (IPIT), a refueling water storage tank (RWST), reactor coolant system inventory/purification (RC-SIP) system, or other coolant source (components not shown). Generally, one or both of the LOCA itself and the response to the LOCA (e.g. venting to depressurize the reactor pressure vessel 14) discharges coolant from the nuclear reactor into the radiological containment, and this discharge transfers both heat and radioactive particles from the nuclear reactor into the radiological containment 16.

Heat transferred into the radiological containment 16 during a LOCA is removed by cooling systems to a heat sink located outside of the radiological containment 16. Additionally, while the nuclear chain reaction is shut down during a LOCA, residual decay heat continues to be generated in the reactor core 12 due to radioactive decay of intermediate fission products. This heat is transferred to a heat sink located outside containment, by a system typically referred to as an emergency core cooling (ECC) system. The heat sink that receives and dissipates the decay heat is typically referred to as the ultimate heat sink (UHS). Heat released into the radiological containment 16 may be rejected to the same UHS that dissipates core residual decay heat, or to a different heat sink. In the illustrative embodiment of FIG. 1, the heat sink for the radiological containment 16 includes a passive containment cooling tank (PCCT) 26 located on the top dome of the radiological containment 16 serves as the heat sink for the radiological containment 16, and optionally may also serve as the UHS. The illustrative PCCT 16 is a covered body of water located inside the containment compartment 20 and disposed on top of the radiological containment 16. Heat released into the radiological containment 16 transfers to the PCCT 26 by thermal communication through the top dome of the radiological containment 16. Some illustrative examples of suitable heat sinks are described, by way of illustrative example, in Watson et al., U.S. Pub. No. 2013/0051511 and Bingham, U.S. Pub. No. 2013/0156143, both of which are incorporated herein by reference in their entireties.

The heat sink for the radiological containment 16 further includes a chimney 30 that is configured to develop an upward-flowing draft in response to heated fluid flowing into a lower portion of the chimney 30. A heat sink conduit 32 is arranged to receive water vapor or steam from the PCCT 26 and to discharge the water vapor or steam into the lower portion of the chimney 30. During a LOCA, heat in radiological containment 16 transfers through the top dome to the PCCT 26, where the heat raises the temperature of the water in the PCCT 26 to produce enhanced evaporation (yielding water vapor) or boiling (yielding steam) that passes through the heat sink conduit 32 and into the lower portion of the chimney 30, so as to develop an upward-flowing draft in the chimney 30 that passively pulls water vapor or steam (and its contained heat energy) through the chimney 30 to discharge at the top of the chimney 30 so as to release the heat to the environment. This passive cooling mechanism provided by the chimney 30 advantageously can continue to operate even if nuclear plant emergency electrical power is lost, as it is the heating of the radiological containment 16 due to the LOCA that develops and maintains the draft in the chimney 30.

The heat sink including the PCCT 26 and chimney 30 provides for removal of heat released into the radiological containment 16 during a LOCA. This pathway does not remove radiological contamination, which is advantageously trapped inside the radiological containment 16. However, in practice the radiological containment 16 has a leakage rate, which is preferably small. In some radiological containment designs, the leakage rate is 0.1% of containment volume per day or lower, providing a decontamination factor over the first 24 hours after a LOCA of approximately 1000. Even this small leakage of radiation from the radiological containment 16 into the surrounding containment compartment 20 is not removed via the heat sink including the PCCT 26 and chimney 30. Although the illustrative PCCT 26 is located inside the containment compartment 20, it is a covered body of water, which blocks ingress of radiation contamination from the containment compartment 20 into the PCCT 26. In other embodiments, the body of water may be located outside of the containment compartment, with (by way of illustrative example) a heat exchanger providing thermal communication between the body of water and the radiological containment.

The containment compartment 20 is not designed to be well-sealed. Accordingly, radioactive contaminants leaking from the radiological containment 16 into the containment compartment 20 are expected to escape into the surrounding ambient (e.g. at gaps between walls, at door gaps, building air ventilation, or so forth). During a LOCA it is advantageous for nuclear power plant operators to remain on-site, and more particularly inside the reactor building 22, in order to carry out remedial procedures in response to the LOCA. If radiation levels in the reactor building 22 (which includes the containment compartment 20) become too high, plant operators must be evacuated, which complicates and may delay the LOCA response.

Accordingly, it is advantageous to remove radioactive contaminents from the containment compartment 20. This can be done using active filtration systems driven by electrically powered blowers. However, these systems rely upon availability of safety-related AC power, which may be unavailable in nuclear plants designed to employ passive safety systems. Even if safety-related AC power is available, it can be lost due to weather-related events or the like.

With continuing reference to FIG. 1, an improved approach disclosed herein relies upon providing the chimney 30 as part of the heat sink for the radiological containment 16 (and/or for removal of reactor core decay heat via the ECC system), and leverages this chimney 30 to also provide motive power to operate the containment compartment radioactive contaminants filtration system. To this end, a fluid conduit 40, 42 is arranged to receive fluid from the containment compartment 20 and to discharge into the chimney 30. Optionally, the fluid conduit includes a filter 44 configured to filter radioactive particles emitted by the nuclear reactor in a LOCA. In the illustrative example, the fluid conduit 40, 42 includes a first fluid conduit 40 arranged to receive fluid from the containment compartment 20 and to discharge into an inlet of the filter 44, and a second fluid conduit 42 arranged to receive fluid from an outlet of the filter 44 and to discharge into the chimney 30. In this approach, the filtering of the air is performed before the air reaches the chimney 30.

Additionally or alternatively, a filter 46 may be provided in the chimney 30, at a point higher in elevation than the point at which the fluid conduit 42 discharges into the chimney 30. In this approach, the air from the containment compartment 20 is filtered after the air is drawn into the chimney 30. A disadvantage of the filter 46 is that it may impede development of the draft in the chimney 30. In some embodiments both filters 44, 46 are provided, and optionally may be filters of different types.

On the other hand, in yet another variant embodiment it is contemplated to omit both filters 44, 46, so that no filtering of the air is performed. This approach (i.e. omitting filtration entirely) still provides the benefit of passively drawing air from the containment compartment 20 so as to remove radioactive particles. Although such radioactive particles would eventually escape via various gaps in the reactor building 22 and/or via existing building ventilation systems (assuming they have motive electrical power during the LOCA), these egress pathways are relatively slow and result in discharge of radioactive contaminants at close to ground level, potentially leading to high radiation levels on the premises. By employing the chimney 30 and conduit 42, 44, the radioactive contaminants are drawn out of the containment compartment 20 and discharged at a high elevation H corresponding to the height of the chimney 30. This disperses and dilutes the radiation over a large area, reducing individual radiation doses.

The filter 44, 46 is configured to filter radioactive particles based on the nature of the particles to be filtered. Some suitable filters include activated charcoal filters, zeolite filters, or combinations thereof; preferable configured to minimize pressure drop across the filters.

The filtration system 40, 42, 44, 46 is integrated with the heat sink 26, 30 comprising the chimney 30 which is used to heat-sink the radiological containment 26 (as shown in FIG. 1) and/or decay heat from the reactor core 12. This integration ensures that the chimney 30 will have a developed draft during any LOCA, which ensures the draft is available for passively driving filtration of the containment compartment 20 during any LOCA event, even if emergency power is lost. Advantageously, there is no need for a blower or pump configured to move fluid through the fluid conduit, as the draft in the chimney 30 provides the motive force.

The temperature in the containment compartment 20 may be elevated due to heat transfer from the radiological containment 16, and may be up to 200° F. or higher in some LOCA scenarios. Air from the containment compartment 20 provided via the fluid conduit 42, 44 may or may not be sufficient, by itself, to develop a draft in the chimney 30. During a LOCA the draft in the chimney 30 is developed and/or reinforced by the (heated) water vapor or steam evolving from the PCCT 26 and discharging via the heat sink conduit 32 into the lower portion of the chimney 30. In general, the draft drives (i.e. pulls) air from the containment compartment 20 into the chimney 30 via the fluid conduit 42, 44. If the draft due to the PCCT 26 (and/or due to the ECC system, if it rejects heat into the chimney 30) is substantially stronger than the draft due to the containment compartment 20, then it may be advantageous for the fluid conduit 44 to be arranged to discharge into the chimney 30 at an elevation that is higher than the elevation at which the heat sink conduit 32 (and/or ECC system) discharges into the chimney 30.

Figure 2:
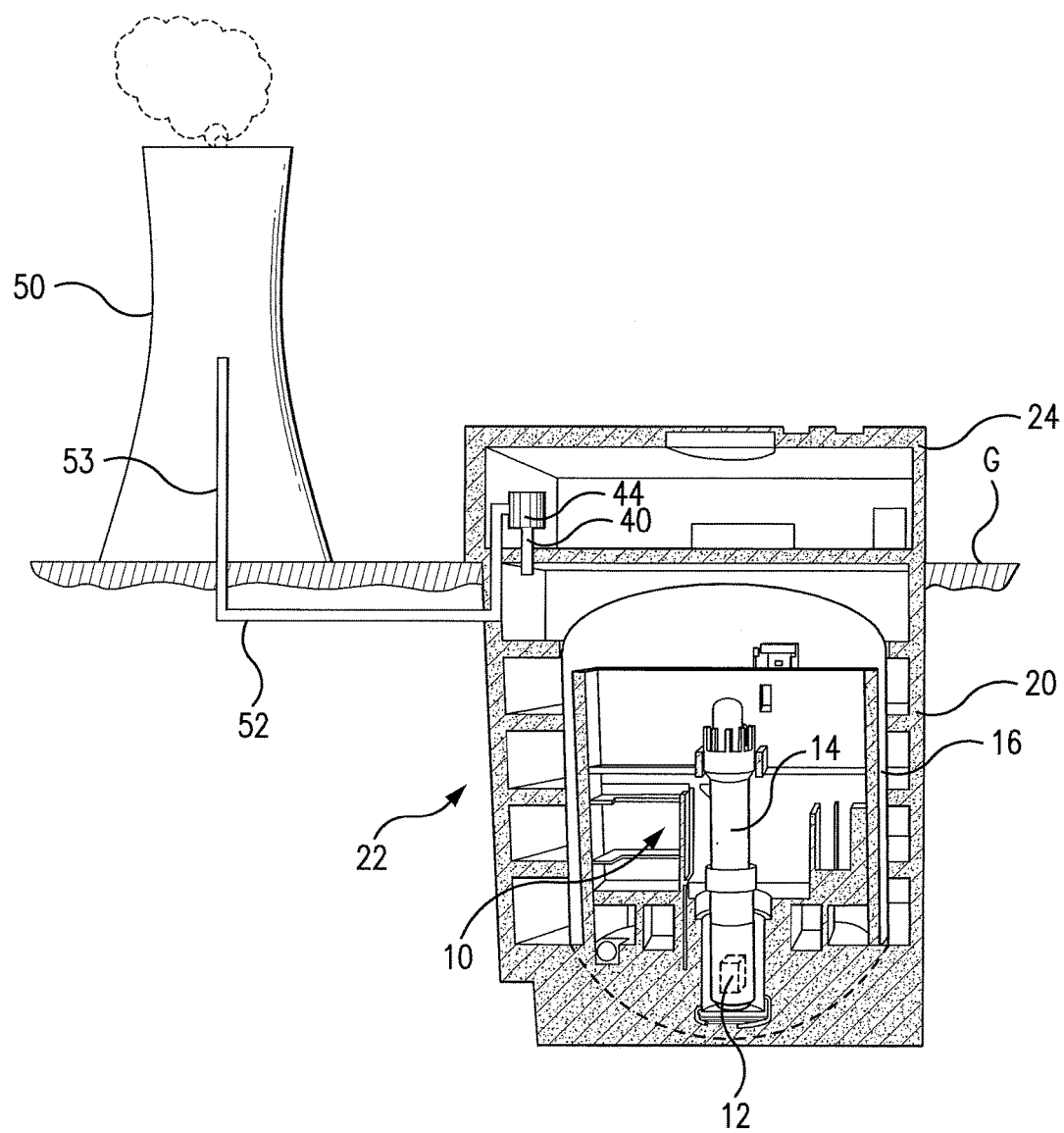
FIG. 2 diagrammatically shows a second illustrative nuclear reactor system embodiment as disclosed herein.

With reference to FIG. 2, another illustrative embodiment is shown, which again operates in conjunction with the nuclear reactor 12, 14 disposed in the radiological containment 16 which in turn is surrounded by the containment compartment 20, which in illustrative FIG. 2 is again part of the reactor service building 22 which further includes an above-ground portion 24. However, the illustrative embodiment of FIG. 2 employs a different heat sink. In the embodiment of FIG. 2 the PCCT 26 and the chimney 30 are omitted, and in their place is provided a cooling tower 50, which in the illustrative example is a hyperboloid cooling tower 50 that develops a natural draft. Hence, the cooling tower 50 is a type of chimney. A body of water (not shown) may be located at the bottom of the cooling tower 50, or may be located elsewhere and connected with the cooling tower 50 by suitable conduits. The heat sink including the cooling tower 50 may receive heat from the radiological containment 26, for example via a set of heat exchangers, and/or may receive heat from the ECC system operating to remove decay heat from the reactor core 12.

In the context of the system of FIG. 2, the passive containment compartment filtration system is modified as follows. The first conduit 40 and the filter 44 are retained; however, the second conduit 42 is replaced by a longer second conduit 52 that runs underground (as shown) or above ground to the cooling tower 50. To provide discharge at an elevated position located well within the draft, the illustrative second conduit 42 an optional vertical standpipe portion 53 located inside the cooling tower 50. Operation is analogous to that described with reference to FIG. 1—the draft developed and maintained in the cooling tower 50 during a LOCA (and perhaps at other times) serves to draw air from the containment compartment 20 through the first conduit 42 into the inlet of the filter 44, through the filter 44, and thence through the second conduit 52, 53 into the cooling tower 50 (which serves as the chimney).

The illustrative embodiments are merely examples. The disclosed passive containment compartment cooling systems are readily employed in combination with other nuclear reactor designs, including PWR designs (both integral and employing external steam generators), BWR designs, and so forth. While an illustrative subterranean nuclear reactor is shown, the nuclear reactor may instead be above-ground, with suitable adjustment of the height H of the chimney. In general, the height of the chimney is chosen to provide the desired heat sinking, and also to provide sufficient draft for operation of the passive containment compartment cooling system. In most cases, it is expected that a height sufficient to provide the heat sinking functionality will also be sufficient for the passive containment compartment cooling system.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

I claim:

1. A nuclear reactor system comprising:
a nuclear reactor including a reactor core comprising fissile material disposed in a reactor pressure vessel;
a radiological containment containing the nuclear reactor;
a containment compartment containing the radiological containment;
a heat sink comprising a chimney configured to develop an upward-flowing draft in response to heated fluid flowing into a lower portion of the chimney, a body of water in thermal communication with a portion of the radiological containment to transfer heat from the radiological containment into the body of water, a heat sink conduit arranged to receive water vapor or steam from the body of water and to discharge the water vapor or steam into the lower portion of the chimney; and
a fluid conduit arranged to receive fluid from the containment compartment and to discharge the fluid from the containment compartment into the chimney,
wherein there are no penetrations of the portion of the radiological containment that is in thermal communication with the body of water of the heat sink.

2. The nuclear reactor system of claim 1 further comprising:
a filter;
wherein the fluid conduit includes:
a first fluid conduit arranged to receive fluid from the containment compartment and to discharge into an inlet of the filter; and
a second fluid conduit arranged to receive fluid from an outlet of the filter and to discharge into the chimney.

3. The nuclear reactor system of claim 2 wherein the filter is capable of removing radioactive materials.

4. The nuclear reactor system of claim 1 wherein the body of water is a covered body of water located inside the containment compartment and disposed on top of the radiological containment to form the thermal communication with the radiological containment to transfer heat from the radiological containment into the body of water.

5. The nuclear reactor system of claim 1 wherein the fluid conduit is arranged to discharge into the chimney at an elevation that is higher than the elevation at which the heat sink conduit discharges into the chimney.

6. The nuclear reactor system of claim 5 wherein there is no blower or pump configured to move fluid through the fluid conduit.

7. The nuclear reactor system of claim 1 wherein there is no blower or pump configured to move fluid through the fluid conduit.

\* \* \* \* \*